(12) United States Patent
Lamb et al.

(10) Patent No.: US 7,072,933 B1
(45) Date of Patent: Jul. 4, 2006

(54) NETWORK ACCESS CONTROL USING NETWORK ADDRESS TRANSLATION

(75) Inventors: Richard H. Lamb, Seattle, WA (US); Eduard Guzovsky, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/489,629

(22) Filed: Jan. 24, 2000

(51) Int. Cl.
G06F 15/16 (2006.01)
(52) U.S. Cl. ...................... 709/203; 713/201
(58) Field of Classification Search .............. 709/200, 709/203, 217–219, 238, 224, 225, 229, 226, 709/245; 707/501; 713/153, 201, 168, 200; 715/500; 370/349
See application file for complete search history.

(56) References Cited

U.S. PATENT DOCUMENTS

| | | | |
|---|---|---|---|
| 5,263,158 A | | 11/1993 | Janis |
| 5,263,165 A | | 11/1993 | Janis |
| 5,694,595 A | | 12/1997 | Jacobs et al. |
| 5,708,780 A | | 1/1998 | Levergood et al. |
| 5,751,956 A | * | 5/1998 | Kirsch et al. ............... 709/203 |
| 5,802,299 A | * | 9/1998 | Logan et al. ............... 709/218 |
| 5,826,014 A | | 10/1998 | Coley et al. |
| 5,835,722 A | | 11/1998 | Bradshaw et al. |
| 5,835,726 A | | 11/1998 | Shwed et al. |
| 5,884,025 A | | 3/1999 | Baehr et al. |
| 5,887,133 A | * | 3/1999 | Brown et al. ............... 709/200 |
| 5,890,171 A | * | 3/1999 | Blumer et al. .............. 707/501 |
| 5,931,946 A | | 8/1999 | Terada et al. |
| 5,941,947 A | | 8/1999 | Brown et al. |
| 5,944,794 A | | 8/1999 | Okamoto et al. |
| 5,968,125 A | * | 10/1999 | Garrick et al. ............. 709/224 |
| 5,991,807 A | | 11/1999 | Schmidt et al. |
| 6,012,090 A | * | 1/2000 | Chung et al. ............... 709/217 |
| 6,061,795 A | | 5/2000 | Dircks et al. |
| 6,061,798 A | | 5/2000 | Coley et al. |
| 6,065,056 A | | 5/2000 | Bradshaw et al. |
| 6,067,623 A | * | 5/2000 | Blakley et al. ............. 713/201 |
| 6,128,298 A | | 10/2000 | Wootton et al. |
| 6,131,120 A | * | 10/2000 | Reid ......................... 709/225 |
| 6,147,986 A | * | 11/2000 | Orsic ........................ 370/349 |
| 6,182,224 B1 | | 1/2001 | Phillips et al. |
| 6,292,833 B1 | * | 9/2001 | Liao et al. .................. 709/229 |
| 6,301,661 B1 | * | 10/2001 | Shambroom ............... 713/168 |
| 6,321,336 B1 | * | 11/2001 | Applegate et al. ......... 713/201 |
| 6,336,140 B1 | * | 1/2002 | Elgressy et al. ............ 709/224 |
| 6,360,262 B1 | * | 3/2002 | Guenthner et al. ......... 709/226 |
| 6,360,270 B1 | * | 3/2002 | Cherkasova et al. ....... 709/229 |

(Continued)

OTHER PUBLICATIONS

Jefferey et al, Proxy-Sharing Proxy Servers, 1996, http://citeseer.nj.nec.com/jeffery96proxysharing.html.*

(Continued)

Primary Examiner—Thong Vu
(74) Attorney, Agent, or Firm—Amin & Turocy, LLP

(57) ABSTRACT

An improved network content filtering system and method utilize the network address translation functionality of a shared network connection to redirect outgoing packets from a client intended for a destination web server to an access controlling web server instead. Before a session to the destination web server is established, the access controlling web server either approves or refuses the connection, providing a content filtering mechanism. If the connection is refused, the access controlling web server may substitute other content for a filtered URL. In order to identify the client, the shared connection may additionally embed an identifier token in the redirected traffic, so as to customize the filtering action or to facilitate billing functions.

32 Claims, 5 Drawing Sheets

U.S. PATENT DOCUMENTS

| | | | |
|---|---|---|---|
| 6,374,298 B1 | 4/2002 | Tanno | |
| 6,389,462 B1* | 5/2002 | Cohen et al. | 709/218 |
| 6,397,246 B1* | 5/2002 | Wolfe | 709/217 |
| 6,405,251 B1* | 6/2002 | Bullard et al. | 709/224 |
| 6,411,994 B1* | 6/2002 | Van Allen et al. | 709/219 |
| 6,415,329 B1* | 7/2002 | Gelman et al. | 709/245 |
| 6,434,627 B1* | 8/2002 | Millet et al. | 709/245 |
| 6,463,474 B1* | 10/2002 | Fuh et al. | 709/225 |
| 6,480,508 B1* | 11/2002 | Mwikalo et al. | 370/475 |
| 6,484,257 B1* | 11/2002 | Ellis | 713/153 |
| 6,510,464 B1* | 1/2003 | Grantges, Jr. et al. | 709/225 |
| 6,513,061 B1* | 1/2003 | Ebata et al. | 709/203 |
| 6,594,692 B1* | 7/2003 | Reisman | 709/219 |
| 6,636,894 B1* | 10/2003 | Short et al. | 709/225 |
| 6,678,733 B1* | 1/2004 | Brown et al. | 709/229 |
| 6,721,784 B1* | 4/2004 | Leonard et al. | 709/206 |
| 2001/0020274 A1* | 9/2001 | Shambroom | 713/201 |
| 2002/0112076 A1* | 8/2002 | Rueda et al. | 709/245 |

OTHER PUBLICATIONS

Challenges in URL Switching for Implementing Globally..— Genova, Christensen (2000) ; www.csee.usf.edu/~christen/sws00.pdf.*
A Simple, Configurable, and Adaptive Network Firewall for Linux—Westall (2000) ; webster.cs.uga.edu/~jam/acm-se/review/referee/westall.ps.*
FSM: A Federated System Manager—Benn, Chen, Gringer ; www.tu-chemnitz.de/~igrdb/docs/fsm-dbr.ps.Z.*
Soft Real Time Scheduling for General Purpose Client-Server Systems—Ingram (1999) www.cl.cam.ac.uk/~dmi1000/linux-srt/hotos.*
Repository in a Box Toolkit for Software and Resource Sharing—Shirley Browne Paul (1999) www.cs.utk.edu/~library/TechReports/1999/ut-cs-99-424.ps.Z.*
Security in the World Wide Web—Jochen Rindfrey www.igd.fhg.de/www/igd-a8/publications/online/secwww.ps.gz.*
Abrahms, Doug, "Self-filter of on-line porn proposed House bill bars federal policing", *Washington Times*; Washington, D.C. Jul. 1, 1995 retrieved from http://proquest.umi.com/pqdweb?DID=000000018018262&Fmt=3&Deli=1&Mtd=1$Idx=11$Sid=7, pp. 1 of 2.
Frederick, Lisa, "School Watch Officials try to reduce access to seamy side of cyberspace", *The Atlantic Constitution* (pre-1997 Fulltext); Atlanta, GA; Sep. 26, 1995, retrieved from http://proquest.umi.com/pqdweb?Did=000000052302955&Fmt=3&Deli=&Mtd=1&Idx=4&Sid-7&, pp. 1 of 2.
Asheem, Chandna, "CoroNet introduces the industry's first management system to monitor applications end-to-end across networks", *PR Newswire*; New York; Mar. 6, 1995, retrieved from http://proquest.umi.com/pqdweb?Did=000000006335301&Fmt=3&Deli=1&Mtd=1&Idx=4&Sid=2&, pp. 1 of 3.
Merenbloom, Paul, "A Phone Call in the Night May Head Off Disaster in the Morning", *InfoWorld*; Farmingham; Oct. 9, 1992, retrieved from http://proquest.umi.com/pqdweb?TS=1039394652&Did=000000000510307&Idex=8&RQT=309&F, pp. 1 of 2.
Wingfield, Nick, "WebTrack lets IS managers monitor corporate Web use", *InfoWorld*; San Mateo; Jul. 10, 1995, retrieved from http://proquest.umi.com/pqdweb?Did=000000006671972&Fmt=3&Deli=1&Mtd=1&idx=2&Sid=3&, pp. 1 of 2.
Grillo, Thomas, "Filtering out the filth: Computer firms offer parents choices on monitoring", *Boston Globe*; Boston, Mass.; Sep. 18, 1995 retrieved from http://proquest.umi.com/pqdweb?TS=1039295215&Did=000000006947361&idx=2&RQT=309&f., pp. 1 of 2.
"On-Line Preventions", *Washington Times*, Washington D.C., Oct. 30, 1995, retrieved from http://proquest.umi.com/pqdweb?Did=000000018074389&Fmt=3&Deku=1&Mtd=1&idx=6&Sid=10, pp. 1 of 2.
Gonzalez, Sean, "Distinct TCP/IP Tools for Windows", *PC Magazine*, Oct. 11, 1994, V. 13, No. 17, p169(3), Library of Congress, Business & Company Resource Center, pp. 1 of 3.
Surkan, Michael, Security; err on the side of caution when considering Internet connections, *PC Week*, Oct. 30, 1995, Vo. 12, No. 43, p110(2), Business & Company Resource Center, pp. 1 of 4.
Douglass, Michelle, "Building the points of passage: firewall-behind-a-firewall strategy grows in popularity", *Computer Dealer News*, Dec. 13, 1995, Vo. 11, No. 25, p44(2), Business & Company Resource Center, pp. 1 of 4.
*The Original Internet Rating System*, http://www.safesurf.com.
*History in the Making*, http://www.safesurf.com/time/htm.
*Internet Content Rating Association*, http://www.icra.org/support/faqs/html.
*Content Advisor*, http://www.microsoft.com/windows/ie/ratings/asp.
Hibbard, J., "Monitoring Employee Access to the Web", *Computerworld*, Dec. 9, 1996, p. 71.
Mather, M., "Exploring the Internet Safely—What Schools Can Do", *Technology and Learning*, vol. 17, No. 1, p. 38, Sep. 1996.
Hudgins-Bonafield, C., "Filtering Knowledge on the Net Just Got Simpler", *Network Computing*, No. 709, p. 22, 1996.
"VPN:Lucent Adds Leading Anti-Virus and Content Filtering Software to Lucent VPN Gateway and Lucent Managed Firewall" *EDGE: Work Group Computing Report*, Mar. 22, 1999.
"Internet Access: Net Nanny and SafeSurf Merge Technologies", *EDGE: Work Group Computing Report*, vol. 8, p. 25, Feb. 24, 1997.
"McAfee to Offer Server-Based Internet Guards", *Newsbytes*, Oct. 3, 1997.
Angel, J., "Lesson 129:Proxy Servers", *Network*, Apr. 1, 1999.
*Net Nanny User Guide*, Net Nanny Ltd., 1994-1997.
Comer, D. *Internetworking with TCP/IP vol. 1: Principles, Protocols, and Architecture*, Prentice Hall, Englewood Cliffs, NJ, 1991.
Zornitza Genova, et al. Challenges in URL Switching for Implementing Globally Distributed Web Sites, 2000, 6 pages.
James M. Westall, A Simple, Configurable, and Adaptive Network Firewall for Linux, 2000, 14 pages.
Wolfgang Benn, et al., FSM: A Federal System Manager, http://citeseer.ist.psu.edu/cache/papers/ca/4719/http:zSzzSzwww.tu-chemnitz.dezSz—igrdbzSzdocszSzfsm-dbr.pdf/fsm-a-federated-system.pdf. Last accessed Jan. 30, 2006, 10 pages.

* cited by examiner

NETWORK ACCESS CONTROL USING NETWORK ADDRESS TRANSLATION

TECHNICAL FIELD

This invention relates generally to network access and, more particularly, relates to filtering of content retrievable from a wide area network such as the Internet.

BACKGROUND OF THE INVENTION

With the explosion of the Internet in recent years, an increasing amount of valuable information has become available online. The Internet has become a global community, rich with resources and communications facilities. However, the Internet is also a frontier that remains largely unregulated, and hence contains many instances of harmful or objectionable material. For example, web sites containing violent or pornographic materials are common, as are sites advocating extremist viewpoints. Additionally, perusers of the Internet are often bombarded with unsolicited advertising that they may find annoying or offensive.

Accordingly, it is often desirable to filter the content that may be retrieved from the Internet. For example, a parent or teacher may wish to prevent a child from viewing materials on violent, pornographic, or bigoted sites. Additionally, users may wish to avoid the receipt of unsolicited advertisements contained within a page being viewed. Certain schemes to effect content filtering are known. For example, Net Nanny® resides on a personal computer (PC) client and works by checking intended URL's with a local list of URL's corresponding to disallowed sites. If the intended URL is on the list, the user is denied access to the site.

Most PC's and other client computers are not connected directly to the Internet. Such computers may instead be linked to the Internet through a router, or "gateway." For example, an Internet service provider may provide Internet access for a home computer through a shared connection. Additionally, some computers, especially those in a commercial environment, reside on a local area network (LAN), which is connected to the Internet through a gateway, which may be a firewall as well.

The placement of the gateway between the LAN, or the home computer, and the Internet has allowed for content filtering by way of what has come to be known as a "proxy server." Also called an application level gateway, a proxy server is essentially an application that intervenes between a sender and a receiver. Proxy servers generally employ network address translation (NAT), a technique which presents a single IP address to the Internet regardless of which particular computer behind the server sent the message. Thus, the proxy server directs all user requests to the Internet as if they were coming from a single IP address, and distributes responses back to the appropriate users.

FIG. 1 illustrates the functionality of a typical proxy server when used for content filtering. As shown, a client 200 transmits a packet for a connection to a URL on the Internet to a gateway 204. In addition to other functions such as address translation and protocol compliance, the gateway 204 instantiates an application level proxy 206 connected to the client via a connection 212. The proxy 206 may contact a local or remote database 208 of disallowed sites to determine whether the requested URL corresponds to a disallowed site. If so, the connection is refused; if the requested URL does not correspond to a disallowed site, the proxy 206 establishes a connection 214 to the remote server 210 corresponding to the requested URL. During the same session, subsequent transmissions are passed by the proxy 206 between the connections 212 and 214.

The proxy server suffers many shortcomings as a means of filtering Internet content. Most importantly, use of a proxy server is slow, given that time must be spent to instantiate the proper proxy. Furthermore, all subsequent packets, even to a previously approved site, are still handled and passed off via the proxy, incurring additional transmission time. Additionally, the use of a proxy sever in this way often requires a reconfiguration of the client application, increasing administrative overhead for the local network.

Another system for filtering Internet content uses the PICS rating system. According to this method, a client browser is configured to first query a PICS/RSACi server regarding a requested URL. If the server indicates that the URL is not disallowed, then the browser proceeds to access the requested URL without any further intervention from the PICS/RSACi server. This system is inadequate in that it allows a clever user to bypass the filtering mechanism at the browser level without facing additional hurdles thereafter. Also, this system increases administrative and overhead costs in that it requires each client machine to be configured to provide the desired filtering communications.

SUMMARY OF THE INVENTION

In view of the foregoing, the present invention provides a method and system for network access control that extends the Network Address Translation (NAT) capabilities of a gateway, firewall, or other shared connection node to redirect communication packets, from a client on a first network destined for a target server on a second network, to an access control server, which then indicates whether access to a resource on the target server should be allowed. In particular, when the client sends handshake packets intended for the target server to the gateway or other shared connection, the gateway redirects the handshake packets to the access control server by rewriting the packet destination address. The access control server sends a response to the gateway which the gateway interprets to either allow or disallow access of the client to the resource on the target server. If access is allowed, all subsequent packets in that session are simply inspected on the fly by the gateway to determine when a connection to a different destination is attempted.

This method operates much more efficiently than existing filtering mechanisms due to its limited intervention in an approved session, as well as its ability to function without instantiating proxies or reconfiguring clients. The filtering function provided by the invention is also difficult to circumvent by local client users because it does not reside on the client machine. Additionally, the invention provides a mechanism whereby content filtering takes place with reference to distributed rather than centralized listings or standards, increasing the variety of lists that may be used.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
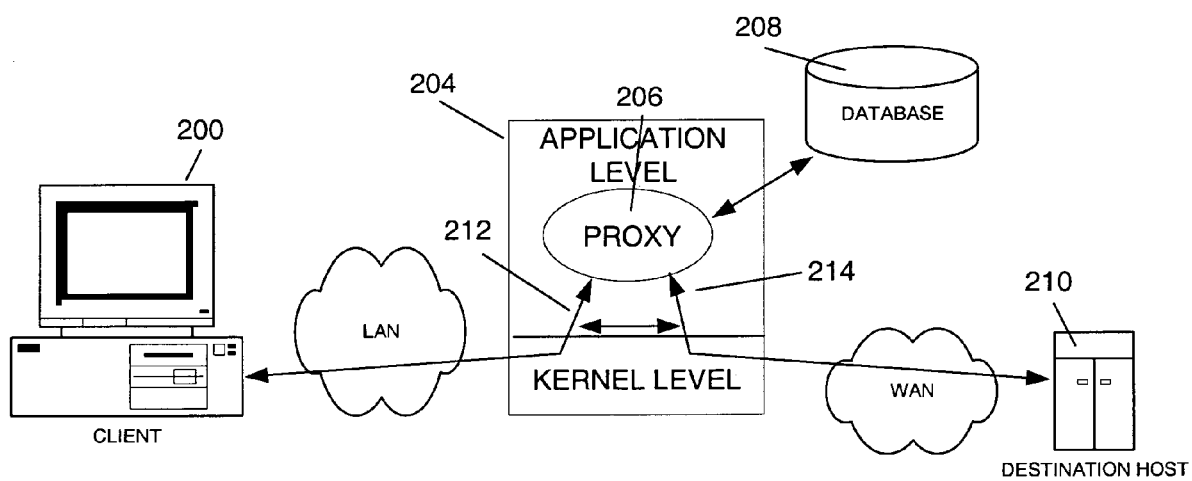
FIG. 1 is a schematic diagram generally illustrating a prior art filtering mechanism.

Turning to the drawings, wherein like reference numerals refer to like elements, the invention is illustrated as being implemented in a suitable computing environment. Although not required, portions of the invention will be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 2:
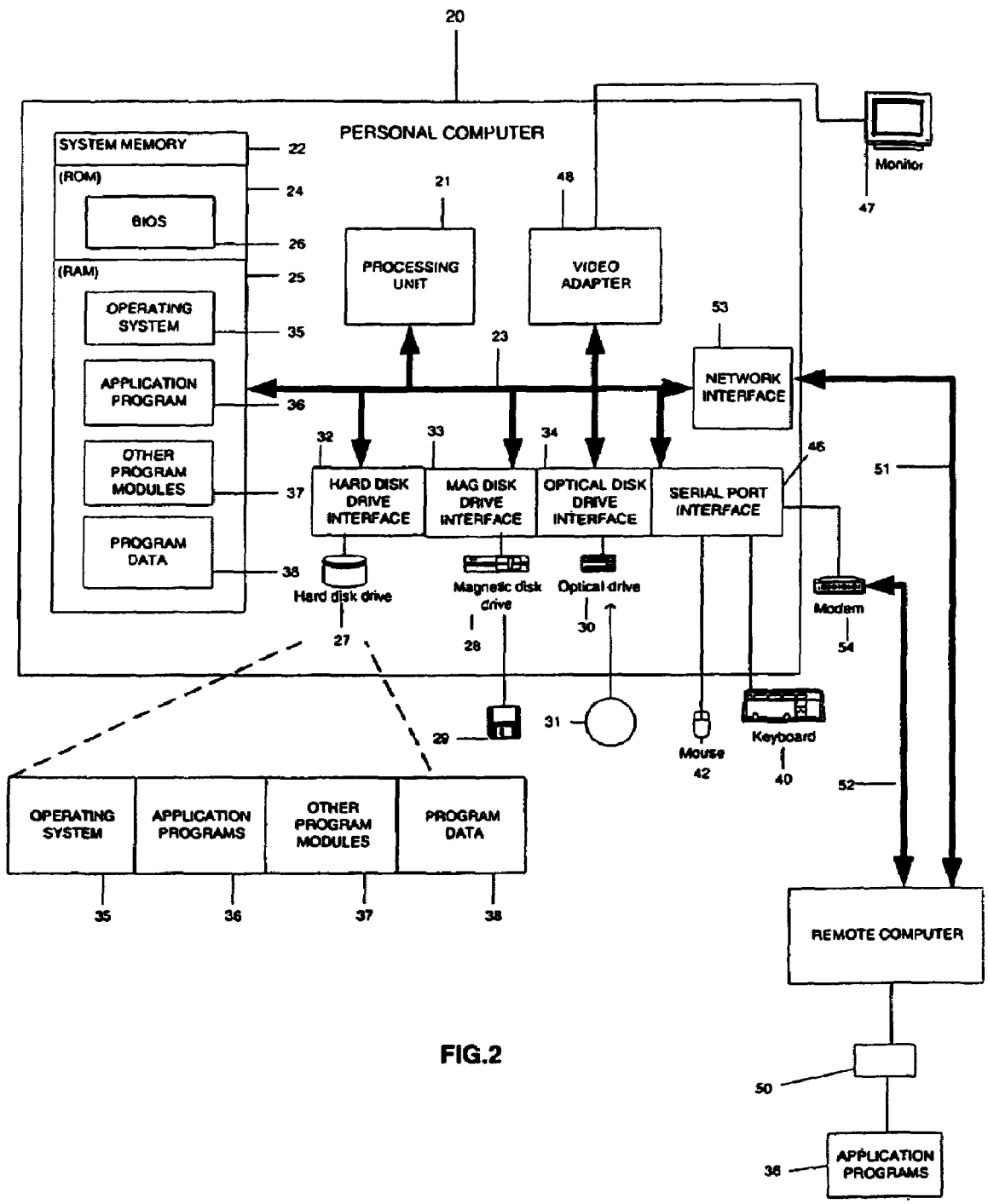
FIG. 2 is a block diagram generally illustrating an exemplary computer system with which the present invention may be used.

With reference to FIG. 2, an exemplary system for implementing a network client machine includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 preferably operates in a networked environment using logical connections to one or more remote computers, such as a remote computer 49. The remote computer 49 may be another personal computer, a server, a router, a network PC, a peer device and/or other common network node, and typically includes many or all of the elements described above relative to the personal computer 20, although only a memory storage device 50 has been illustrated in FIG. 2. The logical connections depicted in FIG. 2 include a local area network (LAN) 51 and a wide area network (WAN) 52. Such networking environments are commonplace in offices, enterprise-wide computer networks, intranets and the Internet.

In a LAN networking environment, the personal computer 20 is connected to the local network 51 through a network interface or adapter 53. In a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

In overview, a system is provided for controlling the information available to a network client residing on a first network, the network client being connectable to an intended information server and a controlling information server residing on a second network via a gateway which resides on both networks. In operation the controlling information server may maintain a list referring to information which is not to be made available to the network client. At the time that the network client requests information from the intended information server, the gateway redirects the request to the controlling information server, which references the list and returns to the gateway an indication of whether the requested information is to be made available to the network client. If the information is to be made available, the gateway establishes a connection between the network client and the intended information server. If the information is not to be made available, the gateway establishes a connection between the network client and the controlling information server.

Figure 3:
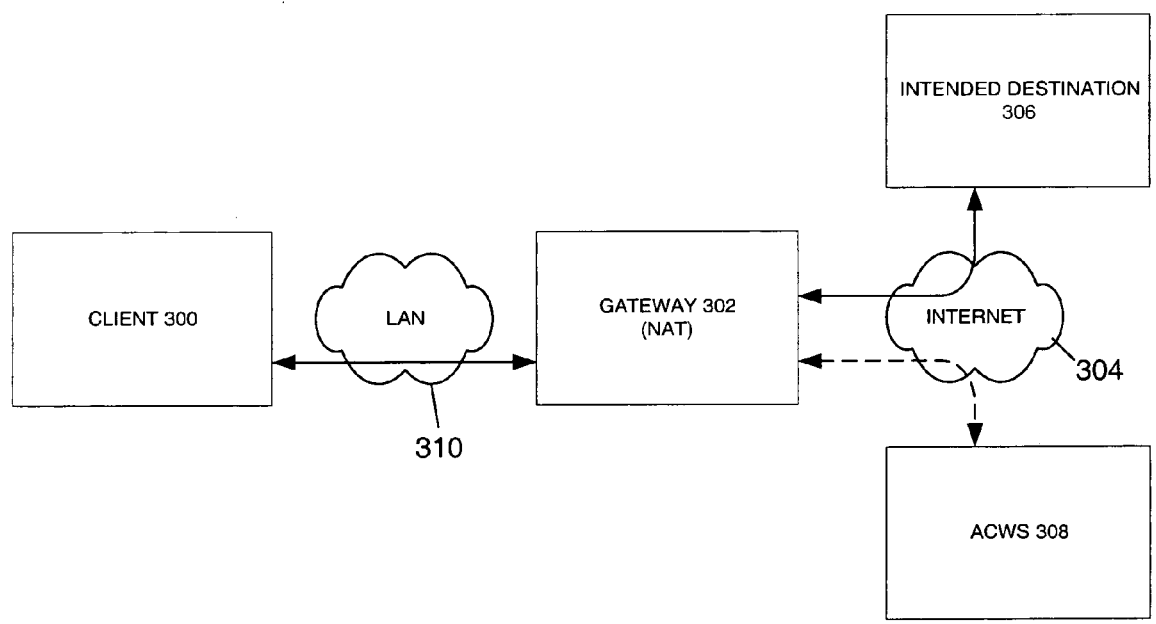
FIG. 3 is a simplified diagram of a network environment having a client, a gateway, an intended server, and a control server for access control, for implementing an embodiment of the invention.

Now referring to FIG. 3 wherein certain aspects of the invention are illustrated in greater detail, a client 300 residing on a local network 310 is communicably connected via a local network connection or otherwise, to a gateway 302. The client 300 may be a PC, workstation or other network capable machine, while the gateway 302 is preferably a firewall, router, or other connection node disposed between the client and a wide area or local area network 304. The gateway 302 preferably resides on both networks. The network 304 is preferably the Internet, but may alternatively be any other similar distributed linked resource system.

In order to retrieve information from the Internet, for instance from intended server 306, the client 300 sends a packet to the gateway 302 to be forwarded to the intended web site. The Internet content within the packet may be embedded in a LAN protocol at this stage, requiring formatting into an Internet protocol, typically TCP/IP, prior to transmission by the gateway.

Each node in a TCP/IP network is assigned an "IP address," which is typically composed of four numbers separated by periods, but which may be composed of more numbers depending upon the protocol used. (For example, a new generation of IP, referred to as IPv6, increases the address space from 32 to 128 bits). Nodes may be clients, servers, routers, and so on. Typically, the address is split between a Net ID, which allows the packet to be routed to other networks, and a Host ID. The exact way in which the address is split between these components is determined by the class system being used, which is indicated via the first three bits of the first byte of the address.

Typically, all of the client machines attached to the local network served by the gateway 302 may be mapped to a single IP address with respect to the other network. To accomplish this, the gateway usually also performs what is known as Network Address Translation (NAT) on any outgoing packets. This entails rewriting the source address in the outgoing packet to correspond to the IP address of the gateway on the other network. On incoming packets, the procedure is reversed, and the packets are routed to the appropriate client. This technique serves both to conserve Internet address space and to hide internal network addresses from possible intruders.

By way of example, referring again to FIG. 3, the client 300 typically sends a packet to the intended destination server 306 via the following process: the client 300 prepares a packet containing, among other things, a source IP address corresponding to the client (for example, 10.1.1.2), and a destination address corresponding to the server 306 (for example, 18.62.0.6). Following standard TCP/IP protocol routing procedure, the client 300 has been configured to send all packets destined off the local network to router 302 on its internal interface (for example, 10.1.1.4). Prior to forwarding the packet to the Internet, the NAT component of the router 302 modifies the packet's source address to correspond to the router's own Internet IP address (for example, 192.101.186.3). At the same time, the router 302 records other session-identifying information, so that the procedure can be accurately reversed for incoming packets. This is necessary because, although not shown, several other computers may also routinely access the Internet via the same router 302. Typically, if the requested URL is not found on the destination server 306, the destination server 306 returns an error code, such as "Error 404: Object not found." For more detailed information regarding TCP/IP networking, the reader is referred to *Internetworking With TCP/IP, Volume I: Principles, Protocols, and Architecture*, by Douglas E. Corner, published by Prentice Hall (1995).

In accordance with an aspect of the present invention, the network address translation capability described above is modified to provide a content filtering mechanism. Referring to FIG. 3, a server 308, which may be an ordinary web server, will be labeled herein as an Access Controlling Web Server (ACWS). The ACWS 308 preferably hosts a list of disallowed URL's, which it recognizes itself to correspond to. As will be described in fuller detail hereinafter, the gateway 302 uses its packet access during network address translation to initially alter the destination as well as the source address of a packet, such that the packet is redirected to the ACWS instead of the intended server 306. Based on a response from the ACWS 308, the gateway 302 decides either to allow all subsequent session transmissions between the client 300 and the server 306, or alternatively to refuse a connection to the server 306, preferably establishing instead a connection to the ACWS 308.

The communications of the invention will be described hereinafter with reference to standard HTTP packets. It will be understood by those skilled in the art that the contents of each packet will be tailored to accomplish the particular transmission in the desired fashion. For example, the GET URL packet will likely reference a particular URL. Generally, within the HTTP protocol, a session is established by way of a handshaking process. This handshaking process consists of a SYN packet from the client, a SYN-ACK packet from the destination, and an ACK packet from the client. This exchange is typically followed by a GET URL packet sent from the client, and a data exchange comprised of DATA and ACK packets between the client and destination. According to an embodiment of the invention, the gateway first alters this ordinary course of events by redirecting the initial handshaking such that it takes place not between the client 300 and server 306, but between the gateway 302 and the ACWS 308.

Figure 4:
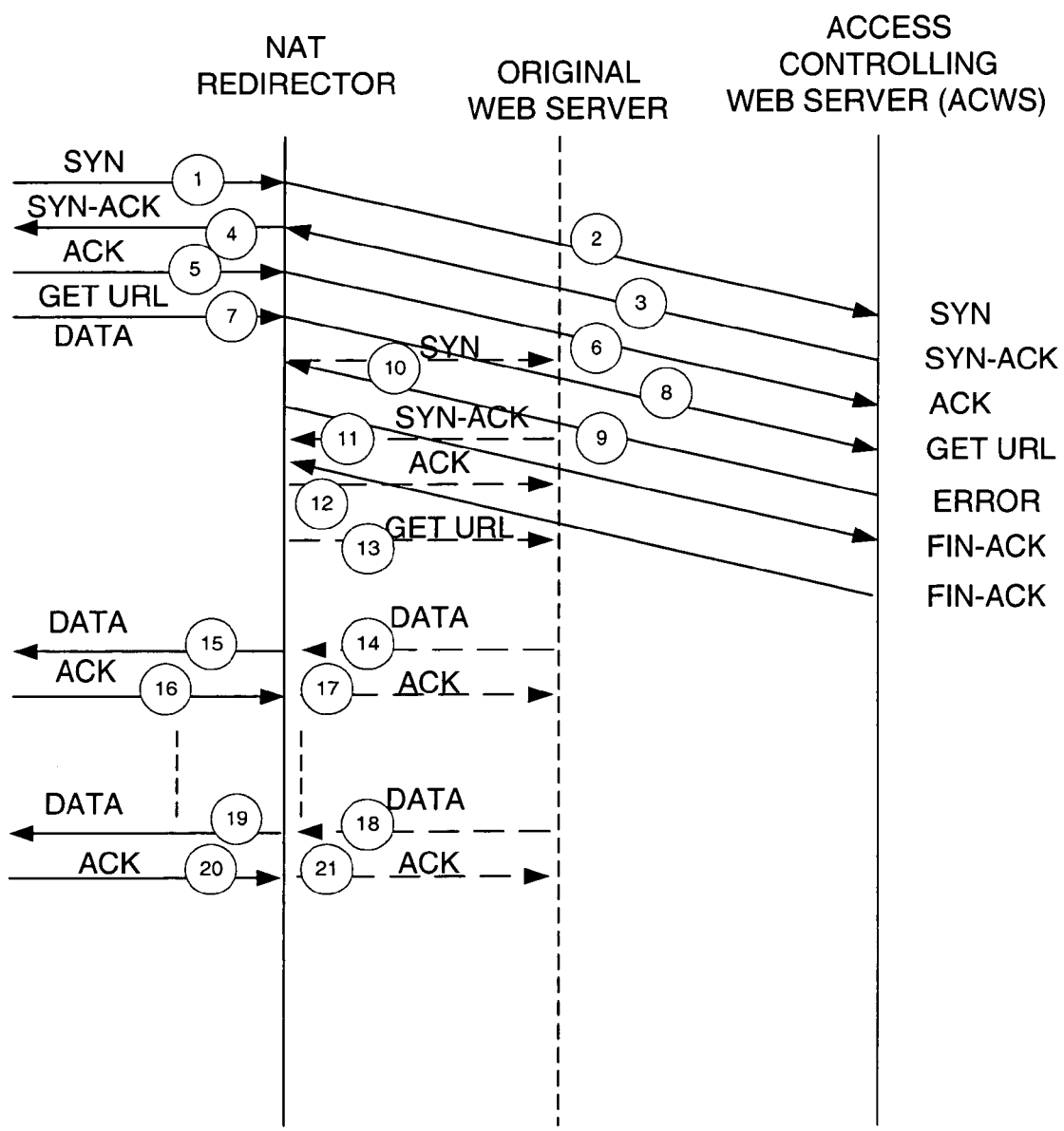
FIG. 4 is a diagram of network communications in the environment of FIG. 3 in a case where access to a desired URL is allowed.

Certain of the communications involved in the redirection process of a preferred embodiment are illustrated in FIG. 4. The illustrated exchange corresponds to a situation wherein the requested URL is not a disallowed URL. To initiate a session, the client 302 in step 1 sends a typical SYN packet destined for the original server 306 to the gateway 302. Typically, agreed upon ports correspond to well-known applications. For example, HTTP applications are usually on port "80", so that a web server is located by specifying its address and port (80). Thus, the SYN packet will typically be addressed to port "80" of the original server 306. This combination, or some other event, may be used by the gateway 302 to detect the start of a new session and hence to begin redirection. Thus, upon receiving this SYN packet, the gateway 302 may change the packet source IP address pursuant to ordinary NAT, and further changes the packet destination IP address to be that of the ACWS 308. Thus, in step 2, the ACWS receives the packet originally destined for server 306.

The ACWS responds in an ordinary manner by transmitting a SYN-ACK packet to the gateway 302 at the indicated IP address in step 3, which is forwarded to the client 300 in step 4, again via ordinary NAT. In steps 5 and 6, an ACK packet is passed from the client to the ACWS via the gateway similarly to the transmissions of steps 1 and 2. At this point, still unaware of the redirection, the client sends a GET URL packet destined for the server 306 in step 7. As with the previous outgoing packets, the gateway 302 redirects this GET URL packet to the ACWS in step 8. As with many typical servers, the ACWS maintains or accesses a list of URL's to which it corresponds. In an embodiment of the invention, this list is preferably a list of disallowed URL's. Upon checking the list, if the ACWS does not locate an entry corresponding to the URL requested in the GET URL packet, the ACWS returns a standard error message, such as "Error 404: Object not found," to the gateway 302 in step 9.

In response to receipt of this error message, the gateway 302 determines that the requested URL is not a disallowed URL. Thus, in step 10 through 13, the gateway replays, and responds to, the initial handshaking packets to the original server 306. To facilitate this exchange, the gateway has preferably maintained a record of the packets involved in the handshaking process. The result of this sequence is to establish a connection between the client and the intended server 306 without apprising the client of the initial redirection. Alternatively, the client may be apprised of the redirection, but it is preferable in the interest of speed and convenience that the client not be required to take additional steps thereafter to effect a connection to the desired server once a URL has been approved. Once steps 2, 3, 6, and 8 have been repeated between the gateway 302 and the server 306 in steps 10–13, a connection is established between the client 300 and the server 306. A data exchange thereafter takes place in steps 15 et seq., with the gateway 302 intervening essentially only to accomplish ordinary NAT and to monitor packets for attempts to start a new session. Although only two data exchanges are shown, there may be an arbitrary number of data exchanges at this point.

Figure 5:
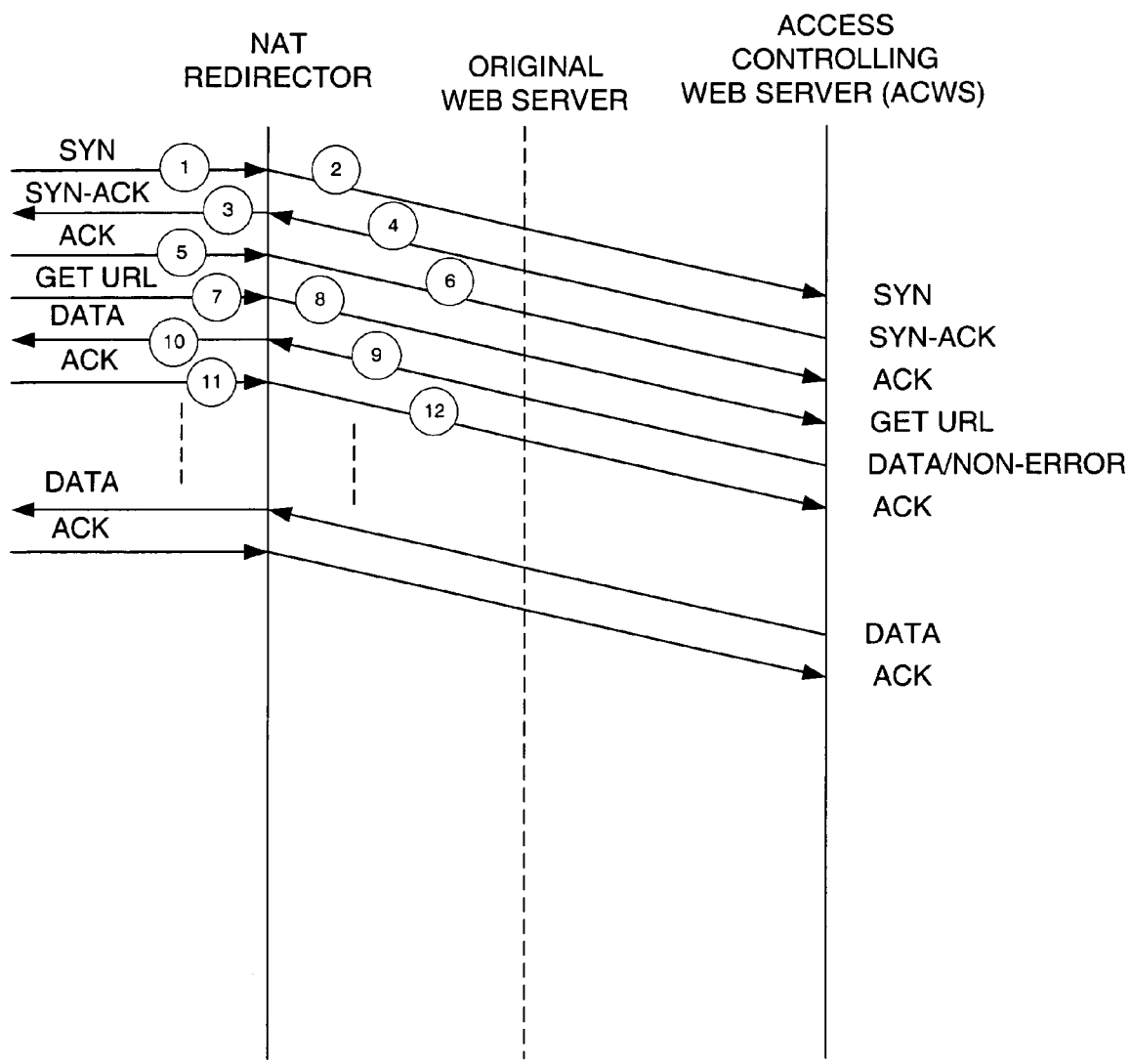
FIG. 5 is a diagram of network communications in the environment of FIG. 3 in a case where access to a desired URL is not allowed.

If the requested URL is a disallowed URL rather than an allowed URL, the network steps and communications may be as illustrated in FIG. 5. In particular, the handshaking sequence of steps 1–8 are preferably the same as the like-numbered steps in FIG. 4. However, it may be that upon receipt of the GET URL packet in step 8, the ACWS 308 finds a corresponding entry in its listing of disallowed URL's. In this event, the ACWS 308 preferably returns data, rather than an error message, to the gateway 302. Upon receiving this data, the gateway 302 preferably performs the standard reverse mapping of the Network Address Translation, forwarding the data to the client 300. Thus a connection is established between the client 300 and ACWS 308, and the client continues in communication with the ACWS 308 rather than the intended destination server 306.

In this situation, the data provided by the ACWS 308 to the client 300 is any desired content. For example, if the desired URL corresponded to advertising material, the ACWS 308 may substitute alternative advertising materials, or some other informative or entertaining material to fill the user interface space allocated for the filtered advertisement. Likewise, if the desired URL corresponded to offensive or inappropriate content, the ACWS 308 may supply an advertisement, or other inoffensive or appropriate material to fill the user interface space allocated for the filtered material. Alternatively, the ACWS 308 could simply provide a notation that content had been filtered or that a connection was not made, a warning or other message, or other filler material such as a design or solid color.

It may be desirable, in keeping with the invention, to allow different filtering with respect to different clients. This is easily accomplished by the gateway 302, by redirecting to different ACWS's depending upon the identity of the client. One benefit of the invention in allowing distributed content filtering, is the elimination of reliance on any single list service. This allows for greater customization and control of the filtering process and parameters.

Along similar lines, it may be desirable to apprise the ACWS of the identity of the client. This may aid in performing authentication, billing functions, customization of response, and so on. One way to accomplish this notification is to embed an identifying token in the initial HTTP GET packet application header, subsequently adjusting sequence and acknowledgment numbers to reflect the change in packet size. Such a token identifies the client and could additionally identify a particular user. Using this method, the added identifying functionality is accomplished transparently to the client, and accordingly to the user.

In an alternative embodiment, the response of the ACWS is inverted from that described above. That is, certain ACWS's could respond to a request for a disallowed URL by transmitting an error message, or a "not OK" message, while responding to an allowed URL request with an "OK" message, instead of an error message. In such an embodiment, the gateway 302 would modify its behavior in accordance with this alternate response scheme, so as to enable connections only to allowed URL's. Accordingly, on receipt of an "OK" response, the gateway would make the desired connection and step out of the process. Examples of potential ACWS's which behave in this manner are existing RSACi Web servers.

It will be appreciated that an improved system and method of network content filtering has been described, which overcomes many shortcomings inherent in prior content filtering methods. The described system and method additionally enable distributed filtering relying on a wide variety of independent content listings, allowing for greater customization and ease of maintenance. All of the references cited herein are hereby incorporated in their entireties by reference.

In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that certain elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

We claim:

1. A method of controlling at a gateway computing device access of a client machine to a desired resource hosted on a destination server, the desired resource being of at least one material type selected from the group including audible materials, readable materials, and viewable materials, comprising:
at the gateway computing device receiving handshaking packets from the client machine having as a destination address the destination server;
redirecting network communications at the gateway computing device, including:
redirecting the entirety of each of the handshaking packets by rewriting the destination address in the handshaking packets' IP headers to route the packets to an access controlling web server that is remote from the client, the gateway, and the destination server;
receiving a content request packet from the client machine at the gateway destined for the destination server intended to retrieve the desired resource from the destination server; and
at the gateway redirecting the content request packet in its entirety by rewriting the destination address in the packet IP header to route the packet to the access controlling web server;
receiving a response at the gateway from the access controlling web server; and
at the gateway, controlling access of the client machine to the desired resource based on the response from the access controlling web server, including refusing the client machine access to the desired resource if the response from the access controlling web server indicates that the client should not have access to the desired resource and granting the client machine access to the desired resource if the response from the access controlling web server indicates that the client should have access to the desired resource.

2. The method according to claim 1, controlling access to the desired resource based on the response from the access controlling web server further comprises:
establishing a connection between the client machine and the destination server if the response indicates that access to the desired resource is allowable.

3. The method according to claim 2, the content request packet comprises a GET URL packet.

4. The method according to claim 3, the response indicates that access to the desired resource is allowable if the access controlling web server does not recognize the URL of the GET URL packet.

5. The method according to claim 4, further comprising refusing a connection to the destination server and establishing instead a connection between the client machine and the access controlling web server if the response is that the access controlling web server recognizes the URL of the GET URL packet.

6. The method according to claim 5, establishing a connection between the client machine and the destination server comprises: resending the handshaking packets and GET URL packet to the destination server transparently with respect to the client machine.

7. The method according to claim 6, further comprising embedding an identity token readable by the access controlling web server in the GET URL packet, the identity token uniquely identifies the client machine.

8. The method according to claim 6, further comprising determining whether to redirect network communications based on the content of a handshaking packet.

9. The method according to claim 8, determining whether to redirect network communications comprises deciding to redirect network communications if the handshaking packet is a SYN packet directed to port 80 on the destination server.

10. The method according to claim 3, the response indicates that access to the desired resource is allowable if the access controlling web server recognizes the URL of the GET URL packet.

11. The method according to claim 10, further comprising refusing a connection to the destination server and establishing instead a connection between the client machine and the access controlling web server if the response indicates that the access controlling web server does not recognize the URL of the GET URL packet.

12. The method according to claim 11, the access controlling web server is an RSACi Web Server.

13. The method according to claim 11, establishing a connection between the client machine and the destination server comprises: resending the handshaking packets and GET URL packet to the destination server transparently with respect to the client machine.

14. The method according to claim 13, further comprising embedding an identity token readable by the access controlling web server in the GET URL packet, the identity token uniquely identifies the client machine.

15. The method according to claim 13, further comprising determining whether to redirect network communications based on the content of a handshaking packet.

16. The method according to claim 15, determining whether to redirect network communications comprises deciding to redirect network communications if the handshaking packet is a SYN packet directed to port 80 on the destination server.

17. A computer-readable medium having computer-executable instructions for controlling access at a gateway computer of a client to a desired resource hosted on a destination server comprising:
receiving handshaking packets at the gateway computer from the client machine having as a destination address an address corresponding to the destination server;
redirecting network communications at the gateway computer, including:
redirecting the entirety of each of the handshaking packets by rewriting the destination address in the handshaking packets' IP headers to route the packets to an access controlling web server that is remote from the gateway computer;
receiving a content request packet from the client machine destined for the destination server intended to retrieve the desired resource from the destination server; and
redirecting the entirety of the content request packet by rewriting the destination address in the packet IP header to route the packet to the access controlling web server;
receiving a response at the gateway computer from the access controlling web server; and
at the gateway computer controlling access of the client machine to the desired resource based on the response from the access controlling web server by granting access if the response indicates that the client may access the desired resource and denying access if the response indicates that the client may not access the desired resource.

18. The computer-readable medium of claim 17, controlling access to the desired resource based on the response from the access controlling web server further comprises:

establishing a connection between the client machine and the destination server if the response indicates that access to the desired resource is allowable.

19. The computer-readable medium of claim 18, the content request packet comprises a GET URL packet.

20. The computer-readable medium of claim 19, the response indicates that access to the desired resource is allowable if the access controlling web server does not recognize the URL of the GET URL packet.

21. The computer-readable medium of claim 20, further comprising refusing a connection to the destination server and establishing instead a connection between the client machine and the access controlling web server if the response is that the access controlling web server recognizes the URL of the GET URL packet.

22. The computer-readable medium of claim 19, establishing a connection between the client machine and the destination server comprises:

resending the handshaking packets and GET URL packet to the destination server transparently with respect to the client machine.

23. The computer-readable medium of claim 22, further comprising embedding an identity token readable by the access controlling web server in the GET URL packet, the identity token uniquely identifies the client machine.

24. The computer-readable medium of claim 22, further comprising determining whether to redirect network communications based on the content of a handshaking packet.

25. The computer-readable medium of claim 24, determining whether to redirect network communications comprises deciding to redirect network communications if the handshaking packet is a SYN packet directed to port 80 on the destination server.

26. The computer-readable medium of claim 19, the response indicates that access to the desired resource is allowable if the access controlling web server recognizes the URL of the GET URL packet.

27. The computer-readable medium of claim 26, further comprising refusing a connection to the destination server, and establishing instead a connection between the client machine and the access controlling web server if the response indicates that the access controlling web server does not recognize the URL of the GET URL packet.

28. The computer-readable medium of claim 27, the access controlling web server is an RSACi Web Server.

29. The computer-readable medium of claim 27, establishing a connection between the client machine and the destination server comprises:

resending the handshaking packets and GET URL packet to the destination server transparently with respect to the client machine.

30. The computer-readable medium of claim 29, further comprising embedding an identity token readable by the access controlling web server in the GET URL packet, the identity token uniquely identifies the client machine.

31. The computer-readable medium of claim 29, further comprising determining whether to redirect network communications based on the content of a handshaking packet.

32. The computer-readable medium of claim 31, determining whether to redirect network communications comprises deciding to redirect network communications if the handshaking packet is a SYN packet directed to port 80 on the destination server.

* * * * *